(12) United States Patent
Yamane et al.

(10) Patent No.: US 11,336,510 B2
(45) Date of Patent: May 17, 2022

(54) INFORMATION PROCESSING SYSTEM, INFORMATION PROCESSING METHOD, AND NON-TRANSITORY RECORDING MEDIUM

(71) Applicant: NEC CORPORATION, Tokyo (JP)

(72) Inventors: Masato Yamane, Tokyo (JP); Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 16/312,441

(22) PCT Filed: Jun. 21, 2017

(86) PCT No.: PCT/JP2017/022817
§ 371 (c)(1),
(2) Date: Dec. 21, 2018

(87) PCT Pub. No.: WO2017/221970
PCT Pub. Date: Dec. 28, 2017

(65) Prior Publication Data
US 2019/0215231 A1    Jul. 11, 2019

(30) Foreign Application Priority Data

Jun. 23, 2016   (JP) .............................. JP2016-124737

(51) Int. Cl.
*H04L 41/069*     (2022.01)
*H04L 43/067*     (2022.01)
(Continued)

(52) U.S. Cl.
CPC .............. *H04L 41/069* (2013.01); *H04J 3/02* (2013.01); *H04L 43/067* (2013.01); *H04L 43/0852* (2013.01)

(58) Field of Classification Search
CPC ........................... H04L 41/069; H04L 43/067
See application file for complete search history.

(56) References Cited

U.S. PATENT DOCUMENTS 6,249,232 B1 *   6/2001   Tamura ................. G08G 1/163
                                                  180/167
6,751,573 B1 *   6/2004   Burch ................. G06F 11/0709
                                                  370/473
(Continued)

FOREIGN PATENT DOCUMENTS

JP         5-224775 A      9/1993
JP         5-298268 A     11/1993
(Continued)

OTHER PUBLICATIONS

JPO Office Action for Application No. 2016-124737 dated Aug. 22, 2017.
(Continued)

*Primary Examiner* — Andrew C Georgandellis
(74) *Attorney, Agent, or Firm* — Sughrue Mion, PLLC

(57) ABSTRACT

Provided is a log information generation apparatus and the like that generates log information where log of communication via a communication network are arranged in communication occurrence order. A log information generation apparatus provides time information including a second time in an information processing apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and generates log information associating arranged time with a content of communication processing, the arranged time obtained by arranging a time of the communication processing based on the difference calculated for the second time by the difference calculation apparatus.

6 Claims, 7 Drawing Sheets

(51) Int. Cl.
*H04L 43/0852* (2022.01)
*H04J 3/02* (2006.01)

(56) References Cited

U.S. PATENT DOCUMENTS

| 7,669,113 | B1* | 2/2010 | Moore | G06F 16/4393 |
| | | | | 715/201 |
| 8,965,968 | B2 | 2/2015 | Yokoyama | |
| 2007/0121432 | A1* | 5/2007 | Kim | G06F 21/10 |
| | | | | 369/30.22 |
| 2010/0210294 | A1* | 8/2010 | Yamaji | H04W 24/08 |
| | | | | 455/500 |

FOREIGN PATENT DOCUMENTS

| JP | 8-287020 A | 11/1996 |
| JP | 2000-242618 A | 9/2000 |
| JP | 2004-139488 A | 5/2004 |
| JP | 2004-187040 A | 7/2004 |
| JP | 2006-262036 A | 9/2006 |
| JP | 4931108 B2 | 5/2012 |
| JP | 2014-168157 A | 9/2014 |
| WO | 2015146112 A1 | 10/2015 |

OTHER PUBLICATIONS

JPO Office Action for Application No. 2016-124737 dated Oct. 24, 2017.
International Search Report for PCT/JP2017/022817 dated Aug. 15, 2017 [PCT/ISA/210].
Written Opinion for PCT/JP2017/022817 dated Aug. 15, 2017 [PCT/ISA/237].
Communication dated Mar. 22, 2019 from the European Patent Office in application No. 17815438.1.

* cited by examiner

Fig.3

| LOG INFORMATION | | |
|---|---|---|
| TIME | COMMUNICATION DESTINATION | PROCESSING CONTENT |
| 12:23:34.123456 | PC2 | TRANSMIT |
| 12:35:22.234567 | PC3 | RECEIVE |
| 12:44:34.345678 | PC2 | RECEIVE |
| ... | ... | ... |

Fig.4

| COMMUNICATION START INFORMATION | |
|---|---|
| PROCESSING TYPE | ARP |
| INFORMATION TRANSMISSION SOURCE | PC1MAC |
| DESTINATION | FFFFFFFFFFFF |

Fig.5

| TIME INFORMATION | |
|---|---|
| TRANSMISSION SOURCE | PC1 |
| DATE | 2015/12/4 |
| TIME | 12:23:34.123456 |
| PROCESSING TYPE | ARP |
| INFORMATION TRANSMISSION SOURCE | PC1MAC |
| DESTINATION | FFFFFFFFFFFF |

Fig.6

| TIME INFORMATION | |
|---|---|
| TRANSMISSION SOURCE | PC2 |
| DATE | 2015/12/4 |
| TIME | 12:23:35.876543 |
| PROCESSING TYPE | ARP |
| INFORMATION TRANSMISSION SOURCE | PC1MAC |
| DESTINATION | FFFFFFFFFFFF |

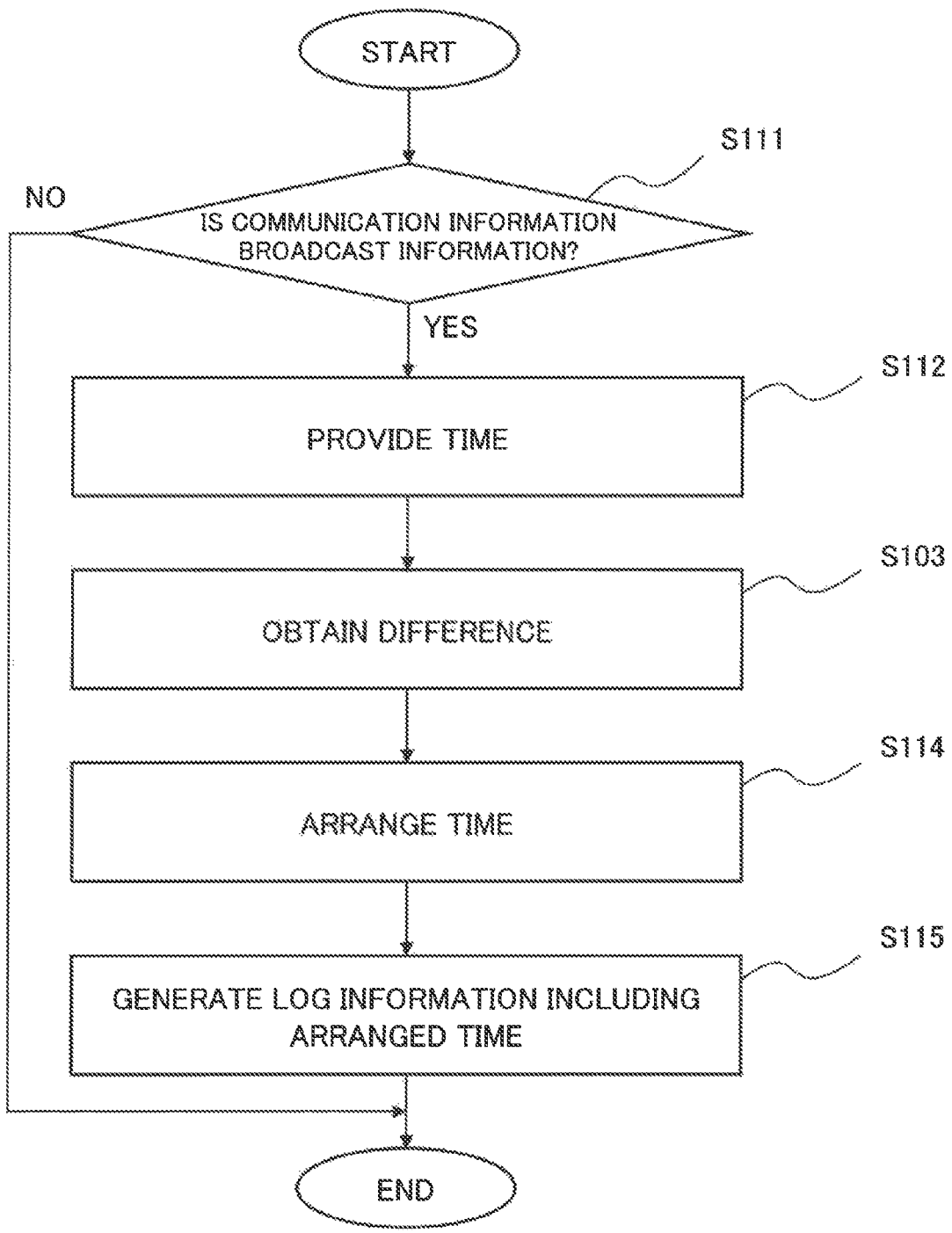

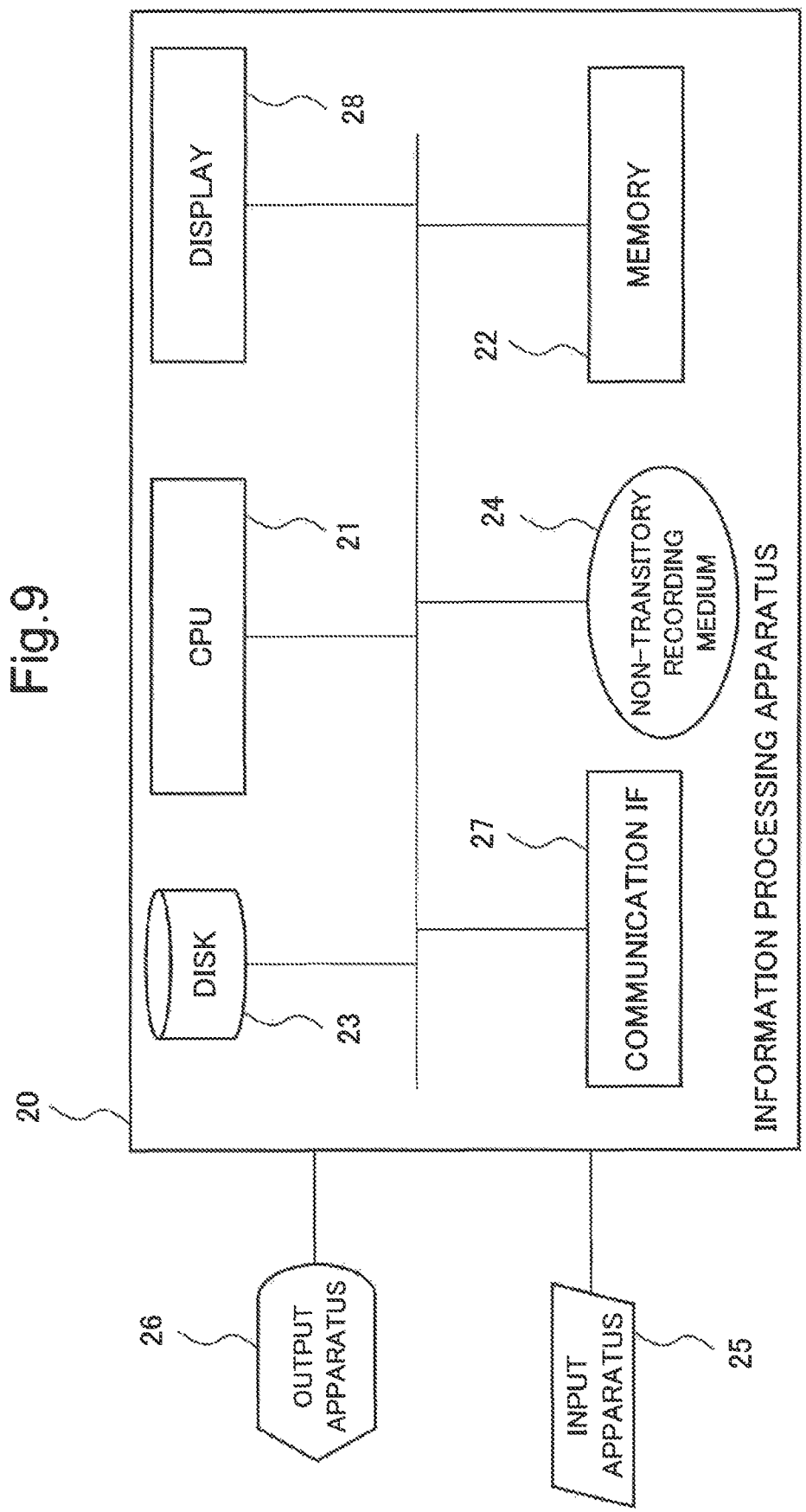

INFORMATION PROCESSING SYSTEM, INFORMATION PROCESSING METHOD, AND NON-TRANSITORY RECORDING MEDIUM

CROSS REFERENCE TO RELATED APPLICATIONS

This application is a National Stage of International Application No. PCT/JP2017/022817, filed on Jun. 21, 2017, which claims priority from Japanese Patent Application No. 2016-124737, filed on Jun. 23, 2016, the disclosures of all of which are incorporated herein in their entirety.

TECHNICAL FIELD

The present invention relates to a log information generation apparatus and the like that generate log information representing a history of processing executed in an information processing apparatus.

BACKGROUND ART

PTL 1 discloses a time coincidence method which enables synchronization of times of respective processing apparatuses included in an information processing system. The information processing system includes a timer master processing apparatus which broadcasts a time of a local apparatus via a transmission line, and a timer slave processing apparatus which receives the time being broadcast via the transmission line. The timer master processing apparatus transmits (in this case, broadcast-transmits) time data Ta in the local apparatus, and time data Tb to each timer slave processing apparatus at a regular time interval. The timer slave processing apparatus receives the time data Ta at a time ta, and receives the time data Tb at a time tb. When a difference between a differential (ta−tb) and a differential (Ta−Tb) is within a permissible range, the timer slave processing apparatus sets the time data Tb as a time in the local apparatus.

PTL 2 discloses a time synchronization processing apparatus which enables times to be synchronized. The time synchronization processing apparatus includes a packet receiving unit, an arrival time recording unit, a clock rate estimation unit, and an offset estimation unit. The packet receiving unit receives a time synchronization packet transmitted from a master computer at a predetermined interval. The arrival time recording unit stores an arrival time when the time synchronization packet is received. The clock rate estimation unit gains an arrival time when the time synchronization packet transmitted at a predetermined interval arrives, and estimates a clock rate from an interval of the arrival time. The offset estimation unit calculates an offset value for correcting a time, based on the estimated clock rate.

CITATION LIST

Patent Literature

PTL 1: Japanese Laid-open Patent Publication No. H05 (1993)-298268
PTL 2: Japanese Patent Publication No. 4931108

SUMMARY OF INVENTION

Technical Problem

However, even when the apparatus disclosed in either PTL 1 or PTL 2 is used, both apparatuses sometimes have a difficulty of arranging an order of historical log of processing (e.g., communication processing) executed in a plurality of information processing apparatuses, in accordance with an order of occurrence of the processing. A reason for this is that, even when times in respective information processing apparatuses are synchronized by use of the apparatus disclosed in either PTL 1 or PTL 2, times in the respective information processing apparatuses are not necessarily synchronized in the case where certain processing is executed.

Thus, one of objectives of the present invention is to provide a log information generation apparatus and the like that generate log information which enables a correct arrangement of an order of logs related to communication processing executed in a communication network in accordance with an order of occurrence of the communication processing.

Solution to Problem

As an aspect of the present invention, a log information generation apparatus including:

time provision means for providing time information including a second time in the log information generation apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and log information generation means for generating log information associating arranged time with an content of communication processing, the arranged time obtained by arranging a time of the communication processing based on the difference calculated for the second time by the difference calculation apparatus.

In addition, as another aspect of the present invention, a log information generation method including:

providing time information including a second time in an information processing apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and generating log information associating arranged time with a content of communication processing, the arranged time obtained by arranging a time of the communication processing based on the difference calculated for the second time by the difference calculation apparatus.

In addition, as another aspect of the present invention, a program conversion program including:

a time provision function for providing time information including a second time in the log information generation apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and a log information generation function for generating log information associating arranged time with an content of communication processing, the arranged time obtained by arranging a time of the communication processing based on the difference calculated for the second time by the difference calculation apparatus.

Furthermore, the object is also achieved by a computer-readable recording medium that records the program.

Advantageous Effects of Invention

A log information generation apparatus and the like according to the present invention can generate log information which enables a correct arrangement of an order of logs related to communication processing executed on a communication network in accordance with an order of occurrence of the communication processing.

BRIEF DESCRIPTION OF DRAWINGS

FIG. 3 is a diagram conceptually illustrating an example of log information.

FIG. 4 is a diagram conceptually illustrating an example of communication start information.

FIG. 5 is a diagram conceptually illustrating an example of time information.

FIG. 6 is a diagram conceptually illustrating an example of time information.

FIG. 8 is a flowchart illustrating a flow of processing in a log information generation apparatus according to the second example embodiment.

FIG. 9 is a block diagram schematically illustrating a hardware configuration of a calculation processing apparatus capable of achieving log information generation apparatuses according to the first and second example embodiments.

EXAMPLE EMBODIMENT

Next, example embodiments of the present invention will be described in detail with reference to the drawings.

First Example Embodiment

Figure 1:
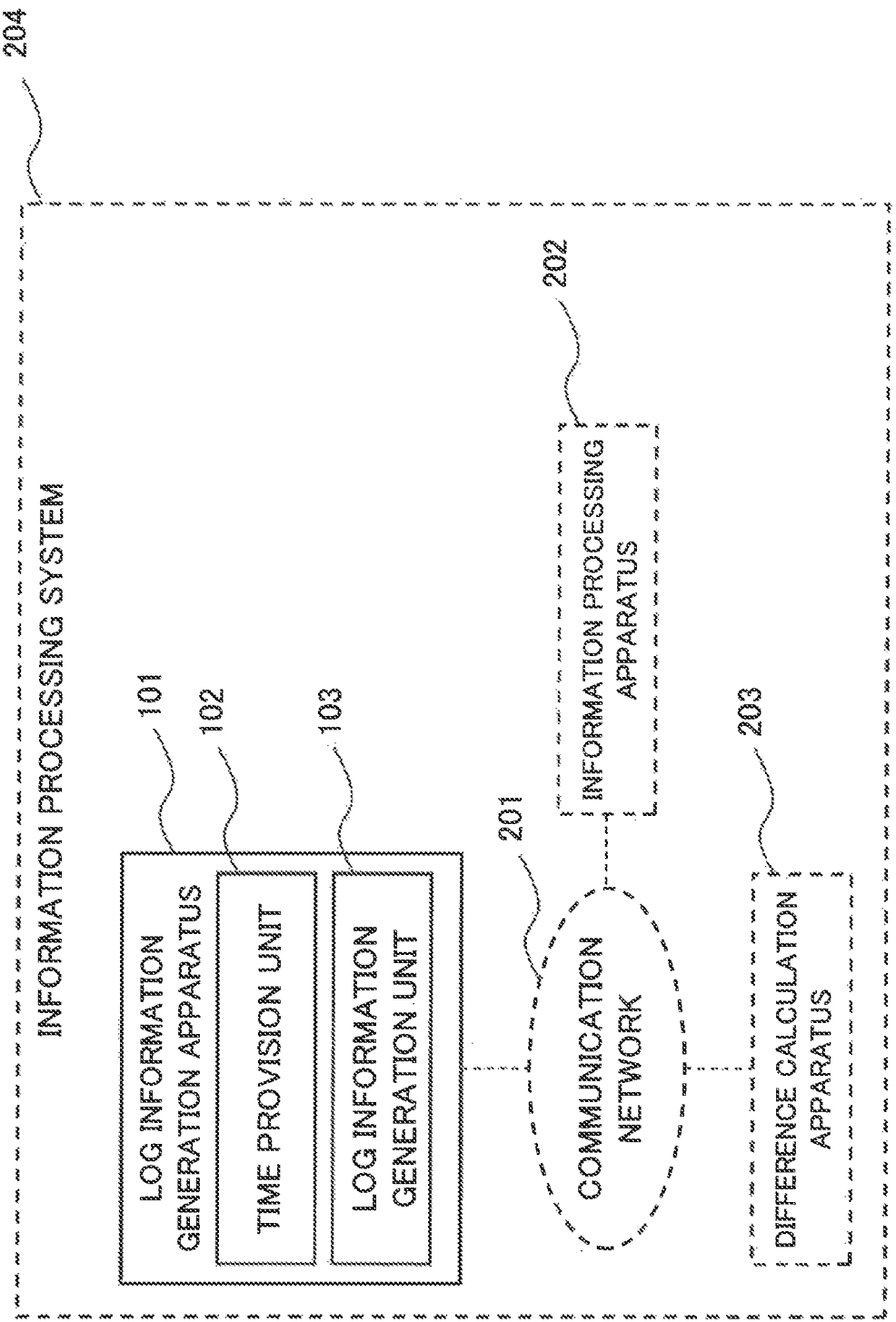
FIG. 1 is a block diagram illustrating a configuration of a log information generation apparatus according to a first example embodiment of the present invention.

A configuration of a log information generation apparatus 101 according to a first example embodiment of the present invention is described in detail with reference to FIG. 1. FIG. 1 is a block diagram illustrating a configuration of the log information generation apparatus 101 according to the first example embodiment of the present invention.

The log information generation apparatus 101 according to the first example embodiment of the present invention includes a time provision unit (time provider) 102 and a log information generation unit (log information generator) 103.

An information processing system 204 includes the log information generation apparatus 101, a communication network 201, a plurality of information processing apparatuses (e.g., information processing apparatuses 202), and a difference calculation apparatus 203. The log information generation apparatus 101 can communicably connect to the information processing apparatus 202 and the difference calculation apparatus 203 via the communication network 201. In the information processing system 204, each information processing apparatus may include the log information generation apparatus 101.

In the following description, it is assumed, for convenience of description, that the log information generation apparatus 101 is included in an information processing apparatus, and can read a time (represented as a "second time") calculated in the information processing apparatus.

The log information generation apparatus 101 receives communication start information (described later with reference to FIG. 4) which is transmitted to the plurality of information processing apparatuses 202 communicably connecting to the communication network 201, for example, when communication processing starts via the communication network 201. The log information generation apparatus 101 reads a second time in response to the received communication start information, and transmits time information (described later with reference to FIGS. 5 and 6) including the read second time to the difference calculation apparatus 203 via the communication network 201.

When receiving time information (described later with reference to FIGS. 5 and 6) including a time from the information processing apparatus 202, the difference calculation apparatus 203 calculates a difference between the time in the received time information and a referential time (hereinafter, represented as a "reference time"), and transmits difference information representing the calculated difference to the information processing apparatus 202 via the communication network 201. For example, the difference calculation apparatus 203 may be an NTP server which arranges a time, or a server related to the information processing apparatus 202 communicably connecting to the communication network 201. NTP represents an abbreviation of network time protocol.

A reference time may be, for example, a time calculated in the difference calculation apparatus 203, a time calculated in the NTP server, or a time received from the information processing apparatus 202 as described later. A reference time is not limited to the examples described above.

The log information generation apparatus 101 receives the difference information transmitted by the difference calculation apparatus 203, calculates an arranged time representing an arranged second time by arranging the second time, based on the received difference information, and generates log information (described later with reference to FIG. 3) representing communication processing executed via the communication network 201, based on the calculated arranged time.

Figure 2:
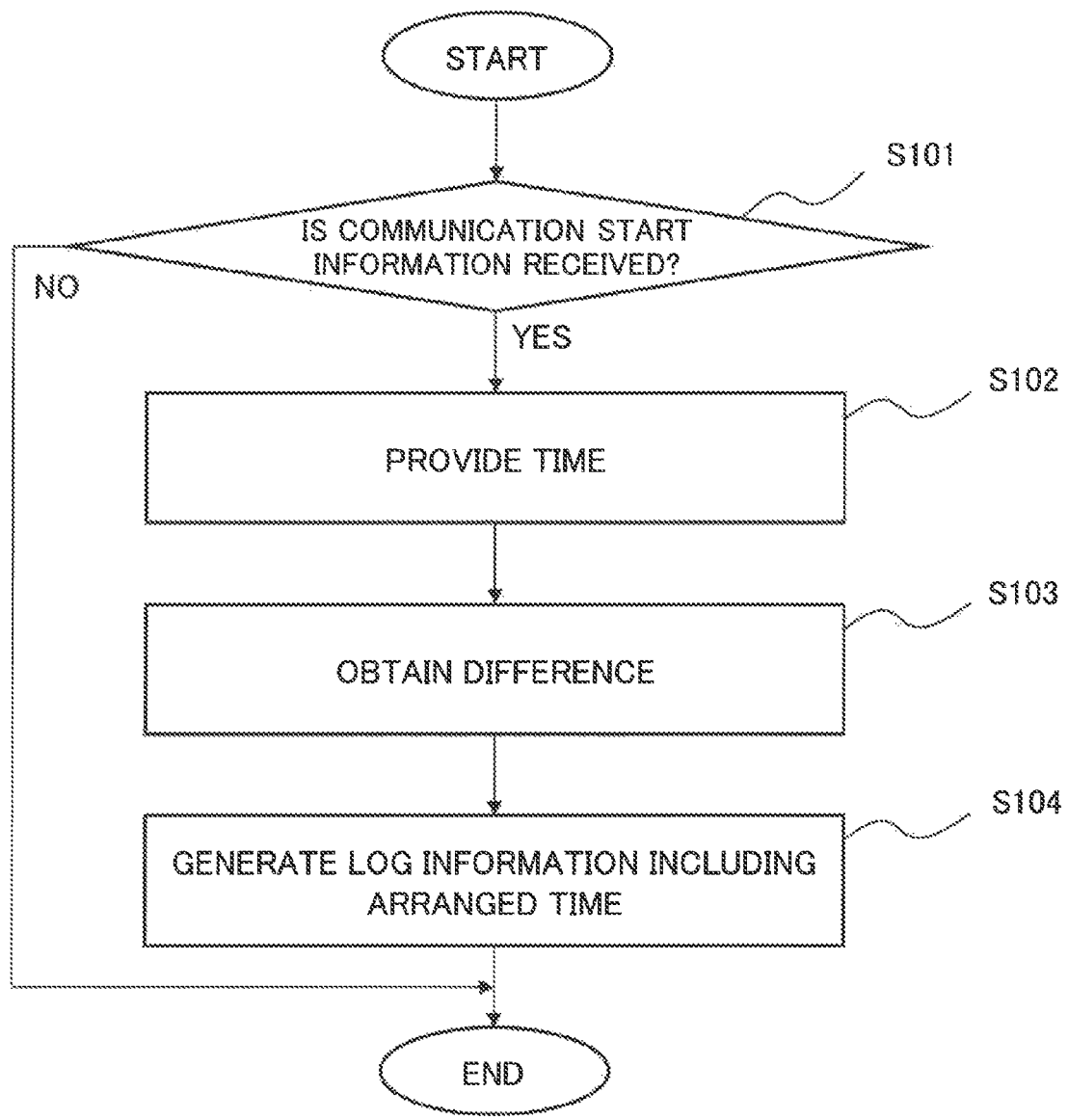
FIG. 2 is a flowchart illustrating a flow of processing in the log information generation apparatus according to the first example embodiment.

The log information generation apparatus 101 executes processing as described later with reference to FIG. 2, for example, in the information processing apparatus 202 being capable of communicating via the communication network 201.

Log information is described with reference to FIG. 3. FIG. 3 is a diagram conceptually illustrating an example of log information.

The log information associates a time (in this case, an arranged time in the information processing apparatus 202) of communication processing, an apparatus identifier of a communication destination in the communication processing, and information representing a processing content related to the communication processing with one another in relation to the communication processing executed by the information processing apparatus 202 via the communication network 201.

The log information exemplified in FIG. 3 associates a time "12:23:34.123456", a communication destination "PC2", and a processing content "transmission" with one another. This represents that, for example, the information processing apparatus 202 has transmitted data to the communication destination "PC2" at a time (in this case, 12:23: 34.123456) calculated in the local apparatus. Numbers written after a decimal point as a time in log information represent a number of seconds below one second. In the log information exemplified in FIG. 3, for example, "123456" are indicated in microseconds. Moreover, the log information exemplified in FIG. 3 associates a time "12:44: 34.345678", the communication destination "PC2", and a processing content "reception" with one another. This represents that, for example, the information processing apparatus 202 has received data from the communication destination "PC2" at a time (in this case, 12:44:34.345678) calculated in the local apparatus.

A time does not necessarily need to be in microseconds, and may be in seconds or milliseconds. Log information is not limited to the examples described above.

Communication start information will be described with reference to FIG. 4. FIG. 4 is a diagram conceptually illustrating an example of communication start information.

Communication start information is information transmitted (in this case, broadcast-transmitted) to the plurality of information processing apparatuses 202 communicably connecting to the communication network 201, when communication processing starts via the communication network 201. As exemplified in FIG. 4, communication start information is, for example, an ARP packet which specifies an IP address allocated to a communication destination. The communication start information exemplified in FIG. 4 associates a processing type of a processing content, an apparatus identifier (an information transmission source in FIG. 4, e.g., a MAC address) of an information processing apparatus being a transmission source that transmits the communication start information, and an apparatus identifier of an information processing apparatus being a destination with one another. The communication start information exemplified in FIG. 4 associates a processing type "ARP", an information transmission source "PC1MAC", and a destination "FFFFFFFFFFFF" with one another. This represents that communication processing is "ARP", an apparatus identifier of an information processing apparatus being a transmission source is "PC1MAC", and an apparatus identifier of an information processing apparatus being a destination is "FFFFFFFFFFFF". For example, when an apparatus identifier of an information processing apparatus being a destination is "FFFFFFFFFFFF", the apparatus identifier "FFFFFFFFFFFF" represents transmission (in this case, broadcast-transmission) to the plurality of information processing apparatuses 202 communicably connecting to the communication network 201. Communication start information is not limited to the examples described above.

Note that ARP represents an abbreviation of address resolution protocol. MAC represents an abbreviation of media access control.

Time information will be described with reference to FIGS. 5 and 6. FIGS. 5 and 6 are diagrams each conceptually illustrating an example of time information.

The time information is information including a time related to the log information generation apparatus 101. The time information is, for example, information associating an apparatus identifier of an information processing apparatus being a transmission source with a time related to the log information generation apparatus 101. The time information may further associate a date with communication start information (exemplified in FIG. 4) being a trigger for generating the time information.

For example, the time information exemplified in FIG. 5 associates a transmission source "PC1", a date "2015/12/4", a time "12:23:34.123456", a processing type "ARP", an information transmission source "PC1MAC", and a destination "FFFFFFFFFFFF" with one another. The time information represents that the information processing apparatus 202 identified by the apparatus identifier "PC1" transmits time information including the date "2015/12/4" and the time "12:23:34.123456" that are the date and time in the log information generation apparatus 101 to the difference calculation apparatus 203. Further, this represents time information transmitted in response to the communication start information (i.e., information associating the processing type "ARP", the information transmission source "PC1MAC", and the destination "FFFFFFFFFFFF" with one another) exemplified in FIG. 4.

Similarly, the time information exemplified in FIG. 6 associates a transmission source "PC2", a date "2015/12/4", a time "12:23:35.876543", a processing type "ARP", an information transmission source "PC1MAC", and a destination "FFFFFFFFFFFF" with one another. The time information represents that the information processing apparatus identified by the apparatus identifier "PC2" has transmitted time information including the date "2015/12/4" and the time "12:23:34.876543" which are the date and time related to the log information generation apparatus 101 to the difference calculation apparatus 203. Further, this represents time information transmitted in response to the communication start information (i.e., information associating the processing type "ARP", the information transmission source "PC1MAC", and the destination "FFFFFFFFFFFF" with one another) exemplified in FIG. 4.

When receiving time information a plurality of times, the difference calculation apparatus 203 identifies communication start information of a plurality of times, based on at least the processing type and the information transmission source in the communication start information within the received time information. For example, referring to the time information exemplified in FIGS. 5 and 6, each piece of time information includes communication start information associating the processing type "ARP", the information transmission source "PC1MAC", and the destination "FFFFFFFFFFFF" with one another. The processing type and the information transmission source included in the time information exemplified in FIG. 5 have the same values as those of the processing type and the information transmission source included in the time information exemplified in FIG. 6, respectively. Therefore, the difference calculation apparatus 203 determines that the time information is transmitted in response to the communication start information exemplified in FIG. 4. When one of the processing type and the information transmission source is different, the difference calculation apparatus 203 determines that the time information is transmitted at a plurality of times in response to another communication start information. In other words, when time information includes communication start information being a trigger for transmitting the time information, the difference calculation apparatus 203 can distinguish the communication start information being a trigger for transmitting the time information. The difference calculation apparatus 203 can distinguish the communication start information even when the time information is transmitted to the communication network 201 a plurality of times.

Next, processing in the log information generation apparatus 101 according to the first example embodiment of the present invention will be described in detail with reference to FIG. 2. FIG. 2 is a flowchart illustrating a flow of processing in the log information generation apparatus 101 according to the first example embodiment.

For convenience of description, it is assumed that the information processing apparatus 202 executes communication processing via the communication network 201.

When starting communication processing via the communication network 201, the information processing apparatus 202 transmits (in this case, broadcasts), for example, communication start information (exemplified in FIG. 4) serving to specify an information processing apparatus being a communication destination to all the information processing apparatuses communicably connecting to the communication network 201. For example, when starting communication processing via the communication network 201, the information processing apparatus 202 broadcasts an ARP packet serving to specify an IP address allocated to a communication destination to all the information processing apparatuses communicably connecting to the communication network 201. Hereinafter, for convenience of description, it is assumed that "broadcast information" is information transmitted to all the information processing apparatuses 202 communicably connecting to the communication network 201.

IP is an abbreviation of Internet protocol.

In the log information generation apparatus 101, the time provision unit 102 determines, regarding all the information processing apparatuses 202 communicably connecting to the communication network 201, whether or not communication start information transmitted at a start of communication processing is received, for example (step S101). When communication start information is the communication start information exemplified in FIG. 4, the log information generation apparatus 101 determines whether or not received communication information is communication start information, for example, based on whether or not a destination is "FFFFFFFFFFFF" in the received communication information.

When receiving broadcast information (YES in step S101), the time provision unit 102 reads, for example, a second time from an information processing apparatus including the log information generation apparatus 101, and transmits (or provides) time information (exemplified in FIGS. 5 and 6) including the read second time to the difference calculation apparatus 203 (step S102). The second time may be a time calculated in the log information generation apparatus 101, or a time calculated in the information processing apparatus 202 including the log information generation apparatus 101.

The difference calculation apparatus 203 receives the time information (exemplified in FIGS. 5 and 6) transmitted by the log information generation apparatus 101, calculates a difference between a time (hereinafter, "referred to as a first time") included in the received time information, and the reference time, and generates difference information representing the calculated difference.

When time information includes communication start information, the difference calculation apparatus 203 may set, as a reference time, a first time included in time information first received regarding the communication start information. In this case, the difference calculation apparatus 203 generates difference information representing that there is no difference for the time information first received regarding the communication start information. By setting the first time included in first received time information as a reference time, the difference calculation apparatus 203 does not need to calculate a reference time in the local apparatus. This brings about advantageous effects that a configuration of the difference calculation apparatus 203 can be simplified.

Furthermore, when time information includes communication start information, the difference calculation apparatus 203 may set, as a reference time, a minimum first time among first times included in time information received regarding the communication start information.

The difference calculation apparatus 203 transmits the generated difference information to the log information generation apparatus 101. In other words, in the information processing system 204, the difference calculation apparatus 203 transmits, to the information processing apparatus 202 which has transmitted time information, difference information generated regarding the time information. As described above with reference to FIGS. 5 and 6, the difference calculation apparatus 203 may distinguish communication start information being a trigger of transmitting time information. In this case, the difference calculation apparatus 203 generates difference information for each piece of communication start information.

In the log information generation apparatus 101, the log information generation unit 103 obtains the difference information generated by the difference calculation apparatus 203 (step S103). When communication processing is executed in the information processing apparatus 202 including the log information generation unit 103, the log information generation unit 103 generates log information (exemplified in FIG. 3) associating an arranged time, which is obtained by arranging a time of the communication processing based on the obtained difference information, with a processing content in the communication processing (step S104). In this case, the log information generation unit 103 reads, as a time of the communication processing, a time calculated by the information processing apparatus 202 including the log information generation apparatus 101. More specifically, when a second time is ahead of a reference time, the log information generation unit 103 calculates, as an arranged time, a time delayed for a difference calculated by the difference calculation apparatus 203 from a time of communication processing. When a second time is behind the reference time, the log information generation unit 103 calculates, as an arranged time, a time advanced by a difference calculated by the difference calculation apparatus 203 from a time of communication processing.

Next, an advantageous effect related to the log information generation apparatus 101 according to the first example embodiment of the present invention will be described.

The log information generation apparatus 101 according to the first example embodiment of the present invention can generate log information which enables a correct arrangement of an order of logs related to communication processing executed on the communication network 201 in accordance with an order of occurrence of the communication processing. A reason for this is that, when a difference between a time referred to by a local apparatus and a reference time is calculated according to broadcast information transmitted at a start of communication processing, and log information representing the communication processing is generated, the log information is generated in accordance with an arranged time in which the time of the communication processing is arranged based on the difference.

Second Example Embodiment

Next, a second example embodiment of the present invention based on the above-described first example embodiment is described.

In the following description, characteristic parts according to the present example embodiment are mainly described, and repeated descriptions are omitted by giving the same reference signs to configurations similar to those in the first example embodiment described above.

Figure 7:
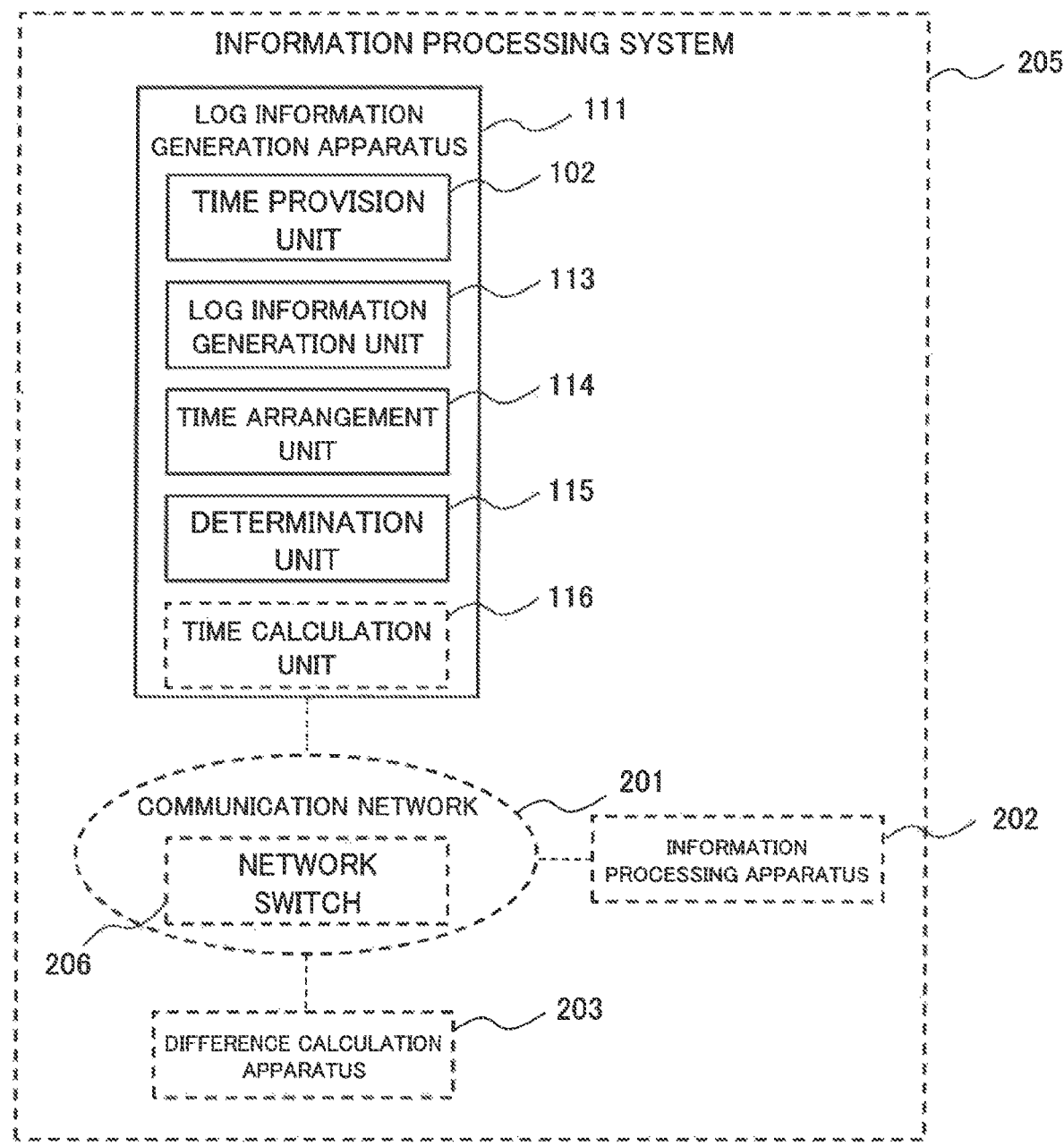
FIG. 7 is a block diagram illustrating a configuration of a log information generation apparatus according to a second example embodiment of the present invention.

A configuration of a log information generation apparatus 111 according to the second example embodiment of the present invention will be described in detail with reference to FIG. 7. FIG. 7 is a block diagram illustrating the configuration of the log information generation apparatus 111 according to the second example embodiment of the present invention.

The log information generation apparatus 111 according to the second example embodiment of the present invention includes a time provision unit (time provider) 102, a log information generation unit (log information generator) 113, a time arrangement unit (time arranger) 114, and a determination unit (determiner) 115. The log information generation apparatus 111 may further include a time calculation unit (time calculator, time generation unit, time generator) 116.

An information processing system 205 includes the log information generation apparatus 111, a communication network 201, a plurality of information processing apparatuses (e.g., information processing apparatuses 202), and a difference calculation apparatus 203. The log information generation apparatus 111 can communicably connect to the information processing apparatuses 202 and the difference calculation apparatus 203 via the communication network 201. In the information processing system 205, each information processing apparatus may include the log information generation apparatus 111. The communication network 201 may include a network switch 206 communicably connecting each of the information processing apparatuses 202 in the information processing system 205.

The time calculation unit 116 calculates (generates) a second time in the log information generation apparatus 111. The log information generation apparatus 111 does not necessarily need to include the time calculation unit 116. For example, the information processing apparatus 202 may have an aspect of including the time calculation unit 116 and the log information generation apparatus 111. In this case, the log information generation apparatus 111 reads the second time calculated (generated) by the time calculation unit 116.

Next, processing in the log information generation apparatus 111 according to the second example embodiment of the present invention will be described in detail with reference to FIG. 8. FIG. 8 is a flowchart illustrating a flow of processing in the log information generation apparatus 111 according to the second example embodiment.

The log information generation apparatus 111 receives information about communication executed via the communication network 201.

In the log information generation apparatus 111, the determination unit 115 determines whether or not the received communication information is broadcast information (step S111). The broadcast information is communication data whose destinations are the plurality of information processing apparatuses 202 communicably connecting to the communication network 201. Whether or not communication data are broadcast information may be determined, for example, based on whether or not a destination is "FFFFFFFFFFFF", as illustrated in FIG. 4. The broadcast information is, for example, communication start information (exemplified in FIG. 4) transmitted at a start of communication processing.

When the communication information is broadcast information (YES in step S111), the time provision unit 102 reads, for example, a time (i.e., the above-described "second time") calculated in the time calculation unit 116, and generates time information (exemplified in FIGS. 5 and 6) including the read second time. The time provision unit 102 provides the generated time information to the difference calculation apparatus 203 (step S112).

In the log information generation apparatus 111, the time arrangement unit 114 obtains difference information transmitted by the difference calculation apparatus 203 in reply to the time information transmitted by the time provision unit 102 (step S103), and arranges the time calculated in the time calculation unit 116 based on a difference represented by the obtained difference information (step S114). When the difference information represents that the second time is behind a reference time, the time arrangement unit 114 executes an arrangement of advancing the time calculated by the time calculation unit 116 by the difference represented by the difference information. When the difference information represents that the second time is ahead of the reference time, the time arrangement unit 114 executes an arrangement of delaying the time calculated by the time calculation unit 116 by the difference represented by the difference information. The time arrangement unit 114 arranges the time calculated by the time calculation unit 116, for example, by changing the time calculated by the time calculation unit 116 at a time.

Thereafter, the log information generation unit 113 generates log information (exemplified in FIG. 3) associating a time of communication processing, a time measured by a time (i.e., a time after arrangement) calculated by the time calculation unit 116, and a processing content related to the communication processing with one another (step S115).

As described above in the first example embodiment, the time provision unit 102 may provide time information including a second time, in reply to not only communication start information transmitted at a start of communication processing in the communication network 201, but also broadcast information transmitted in the communication network 201 (e.g., broadcast information transmitted when the information processing apparatus 202 is activated). In this case, the number of times of arranging the second time increases. Therefore, regarding processing other than communication processing as well, the log information generation apparatus 111 according to the present example embodiment can generate log information which enables a correct arrangement of an order of execution of the processing.

Furthermore, an advantageous effect exerted in the following case will be described. In this case, the communication network 201 is achieved by an aspect in which each of the information processing apparatuses 202 in the information processing system 205 communicably connects to the network switch 206. Moreover, processing of synchronizing times is achieved by broadcast information described in each example embodiment of the present invention (e.g., the communication start information exemplified in FIG. 4). The log information generation apparatus 111 according to the present example embodiment can synchronize times in the respective information processing apparatuses 202 in the information processing system 205 more accurately. A reason for this will be described as follows.

For convenience of description, it is assumed that an error of approximately 1 second per day occurs in an information processing apparatus. In this case, an error of approximately 14 microseconds per second occurs in the information processing apparatus. For example, when Active Directly is used, synchronization processing is executed at certain intervals (e.g., one of 64 to 1024 seconds), and therefore, an error of one of 896 to 14336 microseconds occurs in the information processing apparatus.

In contrast, when communication processing of broadcast information is performed via the network switch 206, a time (i.e., a communication delay time) required for the communication processing is approximately several tens of nanoseconds at most. Therefore, when times in the information processing apparatuses are synchronized by an aspect in which broadcast information is communicated via the network switch 206, an error caused by the synchronization is approximately several tens of nanoseconds at most, and is smaller than an error resulting from synchronization by Active Directly.

Next, advantageous effects related to the log information generation apparatus 111 according to the second example embodiment will be described.

The log information generation apparatus 111 according to the second example embodiment can generate log information which enables a correct arrangement of an order of logs related to communication processing executed on the communication network 201 in accordance with an order of occurrence of the communication processing, and which is related to the communication processing. A reason for this is similar to the reason described in the first example embodiment.

Furthermore, the log information generation apparatus 111 according to the second example embodiment can synchronize the information processing apparatus 202 communicably connecting to the communication network 201 not only with respect to log information representing processing related to communication but also with respect to processing other than communication processing. A reason for this is that a time calculated by the time calculation unit 116, which calculates a time related to the information processing apparatus 202, is arranged by a difference between a second time and a reference time. More specifically, when a second time is a difference behind a reference time, the time arrangement unit 114 advances, by the difference, a time calculated by the time calculation unit 116. Alternatively, when a second time is a difference ahead of a reference time, the time arrangement unit 114 delays, for the difference, a time calculated by the time calculation unit 116. Therefore, the time calculated by the time arrangement unit 114 is arranged and, thereby, synchronization becomes possible not only for processing related to communication but also for processing other than communication.

(Hardware Configuration Example)

A configuration example of hardware resources that achieve a log information generation apparatus according to each example embodiment of the present invention will be described, the log information generation apparatus achieved by using a calculation processing apparatus (information processing apparatus, computer). However, the log information generation apparatus may be achieved by using physically or functionally at least two calculation processing apparatuses. Further, the log information generation apparatus may be achieved as a dedicated apparatus.

FIG. 9 is a block diagram schematically illustrating a hardware configuration of a calculation processing apparatus capable of achieving log information generation apparatuses according to the first and second example embodiments of the present invention. A calculation processing apparatus 20 includes a central processing unit (CPU) 21, a memory 22, a disk 23, a non-transitory recording medium 24, a communication interface (hereinafter, expressed as. "communication I/F") 27, and a display 28. The calculation processing apparatus 20 may connect an input apparatus 25 and an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be hold-able and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the display 28. When a program is input from the outside, the CPU 21 reads the program from the input apparatus 25. The CPU 21 interprets and executes a log information generation program (FIG. 2 or FIG. 8) present on the memory 22 corresponding to a function (processing) indicated by each unit illustrated in FIG. 1, or FIG. 7 described above. The CPU 21 sequentially executes the processing described in each example embodiment of the present invention.

In other words, in such a case, it is conceivable that the present invention can also be made using the log information generation program. Further, it is conceivable that the present invention can also be made using a computer-readable, non-transitory recording medium storing the log information generation program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

A part of or all of the above-described example embodiments may be described as the following supplementary notes. However, the present invention exemplarily described in the above-described example embodiments is not limited to the following.

(Supplementary Note 1)

A log information generation apparatus comprising:

time provision means for providing time information including a second time in the log information generation apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and log information generation means for generating log information associating arranged time with an content of communication processing, the arranged time obtained by arranging a time of the communication processing based on the difference calculated for the second time by the difference calculation apparatus.

(Supplementary Note 2)

The log information generation apparatus according to supplementary note 1 further comprising:

time calculation means for calculating a time, and time arrangement means for arranging time calculated by the time calculation means based on the difference calculated by the difference calculation apparatus, wherein the log information generation means sets the time calculated by the time calculation means to the arranged time after the time arrangement means arranges a time calculated by the time calculation means.

(Supplementary Note 3)

The log information generation apparatus according to supplementary note 1 or supplementary note 2 further comprising:

determination means for determining whether or not communication information received via the communication network is the communication start information, wherein the time provision means provides the time information when the communication information is determined to be the communication start information.

(Supplementary Note 4)

The log information generation apparatus according to supplementary note 3, wherein the determination means determines whether or not the communication information is broadcast information whose destination is a plurality of information processing apparatuses communicably connecting to the communication network, and the time provision means provides the time information when the communication information is determined to be the broadcast information.

(Supplementary Note 5)

The log information generation apparatus according to any one of supplementary notes 1 to 4, wherein the time provision means provides the time information including the second time, an apparatus identifier of the information processing apparatus transmitting the communication start information, and a type of processing executed for the communication start information.

(Supplementary Note 6)

An information processing system comprising:

the log information generation apparatus according to any one of supplementary notes 1 to 5; and the difference calculation apparatus for calculating the difference from the reference time based on the time information provided by the log generation apparatus.

(Supplementary Note 7)

The information processing system according to supplementary note 6, wherein the time information associates the second time and the communication start information with each other, and the difference calculation apparatus sets minimum second time to the reference time, the minimum second time being minimum in the second time included in the time information associated with certain communication start information.

(Supplementary Note 8)

The information processing system according to supplementary note 6, wherein the time information associates the second time and the communication start information with each other, and the difference calculation apparatus sets the second time to the reference time, the second time included in the time information input earliest in the time information associated with certain communication start information.

(Supplementary Note 9)

The information processing system according to any one of supplementary notes 6 to 8 further comprising:

a network switch for relaying communication executed via the network switch among the plurality of information processing apparatuses, wherein the communication start information is transmitted to the plurality of the information processing apparatuses communicably connected via the network switch.

(Supplementary Note 10)

A log information generation method comprising:

providing time information including a second time in an information processing apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and generating log information associating arranged time with a content of communication processing, the arranged time obtained by arranging a time of the communication processing based on the difference calculated for the second time by the difference calculation apparatus.

(Supplementary Note 11)

A recording medium storing a log information generation program, the program causing a computer to achieve:

a time provision function for providing time information including a second time in the log information generation apparatus to a difference calculation apparatus in accordance with communication start information transmitted to a plurality of information processing apparatuses communicably connecting to a communication network at a start of communication processing via the communication network, the difference calculation apparatus calculating a difference between a input first time and a reference time; and a log information generation function for generating log information associating arranged time with an content of communication processing, the arranged time obtained by arranging a time of the communication processing based on the difference calculated for the second time by the difference calculation apparatus.

REFERENCE SIGNS LIST 101 log information generation apparatus
102 time provision unit
103 log information generation unit
201 communication network
202 information processing apparatus
203 difference calculation apparatus
204 information processing system
111 log information generation apparatus
113 log information generation unit
114 time arrangement unit
115 determination unit
116 time calculation unit
205 information processing system
206 network switch
20 calculation processing apparatus 21 cpu
22 memory
23 disk
24 non-transitory recording medium
25 input apparatus
26 output apparatus
27 communication if
28 display

The invention claimed is:

1. An information processing system comprising:
a difference calculation apparatus configured to calculate a difference from a reference time and a time in an information processing apparatus; and
a log information generation apparatus; wherein the log information generation apparatus includes a memory for storing instructions; and a processor connected to the memory and configured to execute the instructions to:
provide time information, the time information including a time in the log information generation apparatus and communication start information, to the difference calculation apparatus, the difference calculation apparatus receiving the time information and calculating a difference between the time included in the received time information and the reference time;
receive difference information transmitted by the difference calculation apparatus, the difference information representing a difference between the reference time and the time received by the difference calculation apparatus;
synchronize a time in the log information generation apparatus to the reference time by using the received difference information; and
generate log information associating an occurrence time of a communication processing with content of the communication processing, the occurrence time measured in the log information generation apparatus, and
the difference calculation apparatus also receives another time information from another log information generation apparatus, the other time information including a time in the other log information generation apparatus and another communication start information, and sets, to the reference time, the time included in the time information received from the log information generation apparatus in response to determining that the time information received from the log information generation apparatus includes communication start information and the time of receiving the time information is earlier than the time of receiving the other time information.

2. The information processing system according to claim 1, further comprising:
the processor is configured to execute the instructions to:
determine whether or not communication information received via a communication network is the information for specifying the identifier of communication destination; and
provide the time information when the communication information is determined to be the information for specifying the identifier of communication destination.

3. The information processing system according to claim 2, wherein the processor is configured to execute the instructions to:
determine whether or not the communication information is broadcast information whose destination is a plurality of information processing apparatuses communicably connecting to the communication network, and
provide the time information when the communication information is determined to be the broadcast information.

4. The information processing system according to claim 1, wherein
the processor is configured to execute the instructions to
provide the time information including the time in the log information generation apparatus and an apparatus identifier of the information processing apparatus transmitting the information for specifying the identifier of communication destination.

5. An information processing method comprising:
providing time information including a time in a log information generation apparatus to a difference calculation apparatus, the time information being information for specifying an identifier of a communication destination, the difference calculation apparatus receiving the time information and calculating a difference between a time included in the received time information and a reference time;
receiving difference information transmitted by the difference calculation apparatus, the difference information representing a difference between the reference time and a time received by the difference calculation apparatus;
synchronizing a time in the log information generation apparatus to the reference time by using the received difference information; and
generating log information associating an occurrence time of a communication processing with content of the communication processing, the occurrence time measured in the log information generation apparatus, wherein
wherein the difference calculation apparatus also receives another time information from another log information generation apparatus, the other time information including a time in the other log information generation apparatus and another communication start information, and sets, to the reference time, the time included in the time information received from the log information generation apparatus in response to determining that the time information received from the log information generation apparatus includes communication start information and the time of receiving the time information is earlier than the time of receiving the other time information.

6. A non-transitory recording medium storing an information processing program, the program causing a computer to execute:
a time provision function configured to provide time information including a time in a log information generation apparatus to a difference calculation apparatus, the time information being information for specifying an identifier of a communication destination, the difference calculation apparatus receiving the time information and calculating a difference between a time included in the received time information and a reference time; and
a function configured to receive difference information transmitted by the difference calculation apparatus, the difference information representing a difference between the reference time and a time received by the difference calculation apparatus;

a function configured to synchronize a time in the log information generation apparatus to the reference time by using the received difference information; and a log information generation function configured to generate log information associating an occurrence time of a communication processing with content of the communication processing, the occurrence time measured in the log information generation apparatus, wherein the difference calculation apparatus also receives another time information from another log information generation apparatus, the other time information including a time in the other log information generation apparatus and another communication start information, and sets, to the reference time, the time included in the time information received from the log information generation apparatus in response to determining that the time information received from the log information generation apparatus includes communication start information and the time of receiving the time information is earlier than the time of receiving the other time information.

\* \* \* \* \*